(12) United States Patent
Wang et al.

(10) Patent No.: US 7,069,545 B2
(45) Date of Patent: Jun. 27, 2006

(54) QUANTIZATION AND COMPRESSION FOR COMPUTATION REUSE

(75) Inventors: Hong Wang, Fremont, CA (US); Perry Wang, San Jose, CA (US); Ralph Kling, Sunnyvale, CA (US); Neil A. Chazin, San Jose, CA (US); John Shen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 489 days.

(21) Appl. No.: 09/751,930

(22) Filed: Dec. 29, 2000

(65) Prior Publication Data

US 2002/0087954 A1 Jul. 4, 2002

(51) Int. Cl.
*G06F 9/44* (2006.01)

(52) U.S. Cl. .................. 717/131; 717/128; 717/139; 717/140; 717/141

(58) Field of Classification Search ......... 717/127–128, 717/139, 140, 130–132, 154, 141; 707/2, 707/6, 512, 536; 715/530; 382/253; 704/238, 704/243

See application file for complete search history.

(56) References Cited

U.S. PATENT DOCUMENTS

| | | | | |
|---|---|---|---|---|
| 4,879,646 A | * | 11/1989 | Iwasaki et al. | 712/227 |
| 5,333,280 A | * | 7/1994 | Ishikawa et al. | 712/241 |
| 5,398,069 A | * | 3/1995 | Huang et al. | 375/240.22 |
| 5,406,279 A | * | 4/1995 | Anderson et al. | 341/51 |
| 5,481,472 A | * | 1/1996 | Chung et al. | 716/21 |
| 5,537,669 A | * | 7/1996 | Evans et al. | 382/141 |
| 5,596,659 A | * | 1/1997 | Normile et al. | 382/253 |
| 5,649,030 A | * | 7/1997 | Normile et al. | 382/253 |
| 5,704,034 A | * | 12/1997 | Circello | 714/38 |
| 5,748,786 A | * | 5/1998 | Zandi et al. | 382/240 |
| 5,822,465 A | * | 10/1998 | Normile et al. | 382/253 |
| 5,832,474 A | * | 11/1998 | Lopresti et al. | 707/2 |
| 5,867,699 A | * | 2/1999 | Kuslak et al. | 712/240 |
| 5,974,538 A | * | 10/1999 | Wilmot, II | 712/218 |
| 5,999,737 A | * | 12/1999 | Srivastava | 717/162 |

(Continued)

OTHER PUBLICATIONS

Title: Dynamic instruction reuse , Authors: Avinash Sodani, Gurindar S. Sohi, ACM, 1997.*

(Continued)

*Primary Examiner*—Chameli C. Das
(74) *Attorney, Agent, or Firm*—Schwegman, Lundberg, Woessner & Kluth, P.A.

(57) ABSTRACT

Software reuse instances are found from an execution trace through a process of quantization, discovery, and synthesis. Quantization includes mapping n-dimensional vectors that correspond to instructions, live-in states, and live-out states to one dimensional symbols, and arranging the symbols into a text in program execution order. Discovery includes the identification of recurrent symbols and recurrent phrases of symbols within the text. Recurrent symbols and phrases correspond to reuse instances. Compression algorithms are applied to identify the recurrent symbols and phrases. Synthesis can include correlating the reuse instances with the binary program to identify the reuse regions within the software program. Synthesis can also include generating non-essential code and corresponding triggers for a conjugate processor.

31 Claims, 8 Drawing Sheets

U.S. PATENT DOCUMENTS

| | | | | |
|---|---|---|---|---|
| 6,035,422 | A * | 3/2000 | Hohl et al. | 714/35 |
| 6,076,159 | A * | 6/2000 | Fleck et al. | 712/241 |
| 6,078,745 | A * | 6/2000 | De Greef et al. | 717/151 |
| 6,112,298 | A * | 8/2000 | Deao et al. | 712/227 |
| 6,119,222 | A * | 9/2000 | Shiell et al. | 712/238 |
| 6,128,724 | A * | 10/2000 | Lee et al. | 712/32 |
| 6,138,230 | A * | 10/2000 | Hervin et al. | 712/216 |
| 6,215,910 | B1 * | 4/2001 | Chaddha | 382/253 |
| 6,304,888 | B1 * | 10/2001 | Mizuta | 708/444 |
| 6,304,960 | B1 * | 10/2001 | Yeh et al. | 712/236 |
| 6,311,181 | B1 * | 10/2001 | Lee et al. | 707/5 |
| 6,370,634 | B1 * | 4/2002 | Burtsev et al. | 712/10 |
| 6,453,350 | B1 * | 9/2002 | Factor | 709/226 |
| 6,483,927 | B1 * | 11/2002 | Brunk et al. | 382/100 |
| 6,516,022 | B1 * | 2/2003 | Özlütürk et al. | 375/152 |
| 6,628,846 | B1 * | 9/2003 | Craver et al. | 382/305 |
| 6,633,958 | B1 * | 10/2003 | Passint et al. | 711/141 |
| 6,691,222 | B1 * | 2/2004 | Janik et al. | 712/219 |
| 6,941,545 | B1 * | 9/2005 | Reese et al. | 717/130 |
| 6,944,853 | B1 * | 9/2005 | Topham | 717/158 |
| 6,954,923 | B1 * | 10/2005 | Yates, Jr. et al. | 717/130 |

OTHER PUBLICATIONS

Title: Hardware Support for Dynamic Activation of compiler-directed computation reuse, Daniel A. Connors et al, ACM, Nov., 2000.*

Title: Compiler directed dynamic computation resue: rationale and initial results, Connors et al, 1999.*

Title: Speech coding based upon vector quantization, Buzo et al, 1980, IEEE.*

Title: An Emperical Analysis of Instruction Repetition, Sodani et al, ACM, 1998.*

Title: Compiler directed dynamic computation reuse: Rationale and initial results, Coonors et al, IEEE, 1999.*

Title: Instruction issue logic for high-performance, interruptable pipelined processor, author: Sohi et al, ACM, 1987.*

Title: Synthesis of Pipelined Instruction Set processors, author: Cloutier et al, ACM, 1993.*

Nevill-Manning, C.G., et al., "Compressing Semi-Structured Text Using Hierarchical Phrase Identification", *Proc. Data Compression Conference*, IEEE Press, 10 pgs., (1996).

Nevill-Manning, C.G., "Linear-Time, Incremental Hierarchy Inference for Compression", *Proc. Data Compression Conference*, IEEE Press, 9 pgs, (1997).

Pipeline Behavior Prediction for Superscalar Processors by Abstract Interpretation, author: Scheider et al, ACM, 1999.*

On parallel execution of multiple pipelined hash joins, author: Hsiao et al, ACM, 1994.*

Register Requirements of Pipelined Processors, author: Mangione-Smith et al, ACM, 1992.*

* cited by examiner

Fig. 1

```
.data1  5,5,5,5 —202
.data2  6,6,6,6 —204

MOV  data1,R2 —206
LOOP1: MOV  4,R1 —208
LOOP2: LD   (R2),R3 —210
       ADD  R3,1,R4 —212
       ADD  R3,1,R3 —214
       SUB  R1,1,R1 —216
       BN2  R1,LOOP2 —218
       MOV  data2,R2 —220
       BR COND LOOP1 —222
```

Fig. 2

| VECTOR | SYMBOL |
|---|---|
| 302—MOV data1 R2 | 0 |
| 304—MOV 4 R1 | 1 |
| 306 { LD (R2) R3 | 2 |
| ADD R3,1 R4 | 3 |
| ADD R3,1,R3 | 4 |
| 308 { SUB R1,1,R1 | 5 |
| BN2 R1, LOOP2 | 6 |
| 310 { LD (R2),R3 | 2 |
| ADD R3,1 R4 | 3 |
| ADD R3,1,R3 | 4 |
| 312 { SUB R1,1,R1 | 7 |
| BN2 R1,LOOP2 | 8 |
| 314 { LD (R2),R3 | 2 |
| ADD R3,1 R4 | 3 |
| ADD R3,1,R3 | 4 |
| 316 { SUB R1,1,R1 | 9 |
| BN2 R1 LOOP2 | 10 |
| 318 { LD (R2),R3 | 2 |
| ADD R3,1 R4 | 3 |
| ADD R3,1,R3 | 4 |
| 320 { SUB R1,1,R1 | 11 |
| BN2 R1 LOOP2 | 12 |
| 322—MOV data2,R2 | 13 |
| 324—BR COND LOOP1 | 14 |

*Fig. 3A*

| VECTOR | SYMBOL |
|---|---|
| 354— MOV 4, R1 | 1 |
| 356 { LD (R2),R3 | 15 |
| ADD R3,1,R4 | 16 |
| ADD R3,1,R3 | 17 |
| 358 { SUB R1,1,R1 | 5 |
| BN2 R1,LOOP2 | 6 |
| 360 { LD (R2),R3 | 15 |
| ADD R3,1,R4 | 16 |
| ADD R3,1 R3 | 17 |
| 362 { SUB R1,1,R1 | 7 |
| BN2 R1,LOOP2 | 8 |
| 364 { LD (R2),R3 | 15 |
| ADD R3,1,R4 | 16 |
| ADD R3,1 R3 | 17 |
| 366 { SUB R1,1,R1 | 9 |
| BN2 R1,LOOP2 | 10 |
| 368 { LD (R2),R3 | 15 |
| ADD R3,1,R4 | 16 |
| ADD R3,1,R3 | 17 |
| 370 { SUB R1,1,R1 | 11 |
| BN2 R1,LOOP2 | 12 |

QUANTIZATION AND COMPRESSION FOR COMPUTATION REUSE

FIELD

The present invention relates generally to computation reuse of software code, and more specifically to methods and apparatus for identifying software code for computation reuse.

BACKGROUND

Modern software programs include many instructions that are executed multiple times each time the program is executed. Typically, large programs have logical "region" of instructions, each of which may be executed many times. When a region is one that is executed more than once, and the results produced by the region are the same for more than one execution, the region is a candidate for "computation reuse." The term "computation reuse" refers to the reusing of results from a previous execution of the region.

For example, a reuse region could be a region of software instructions that, when executed, read a first set of registers and modify a second set of registers. The identity of the first set of registers and the data values in the first set of registers are the "live-in states" to the reuse region, and the identity of the second set of registers and the data values deposited into the second set of registers are the "live-out states" of the reuse region. A hardware buffer holding live-in states and live-out states can be maintained for the region. Each entry in the buffer is termed a "reuse instance." When the region is encountered during execution of the program, the buffer is consulted and if an instance with matching live-in states is found, the results, namely, data in the live-out states, can be used without having to execute the software instructions in the reuse region. When reusing the results is faster than executing the software instructions in the region, performance improves.

The identification of regions that are candidates for reuse has been the subject of much study. One mechanism for identifying candidate regions is discussed in: Daniel Connors & Wen-mei Hwu, "Compiler-Directed Dynamic Computation Reuse: Rationale and Initial Results," Proceedings of the 32nd Annual International Symposium on Microarchitecture (MICRO), November 1999. Connors and Hwu use a compiler to identify candidate regions for computation reuse rather than identifying candidate reuse regions in already-compiled programs.

Another mechanism for identifying computation reuse potential involves using special purpose hardware during program execution to dynamically compare individual instruction instances with previously executed instruction instances. Such an approach is discussed in: Avinash Sodani and Gurindar S. Sohi, "Understanding the Differences Between Value Prediction and Instruction Reuse," 31th International Symposium on Microarchitecture (MICRO-31), November–December 1998. This approach can operate on already-compiled programs, but is limited to the identification of individual instructions as candidates for computation reuse.

For the reasons stated above, and for other reasons stated below which will become apparent to those skilled in the art upon reading and understanding the present specification, there is a need in the art for an alternate method and apparatus for the identification of instructions and code regions that are candidates for computation reuse.

DESCRIPTION OF EMBODIMENTS

In the following detailed description of the embodiments, reference is made to the accompanying drawings which show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism to identify code regions that are candidates for computation reuse. An execution trace of a program is represented by a sequence of multi-dimensional vectors, each vector corresponding to a dynamic instance of an instruction and its live-in states and live-out states. The sequence of vectors is mapped into a text of one-dimensional symbols. Redundancy within the text of one-dimensional symbols represents opportunities for computation reuse.

Figure 1:
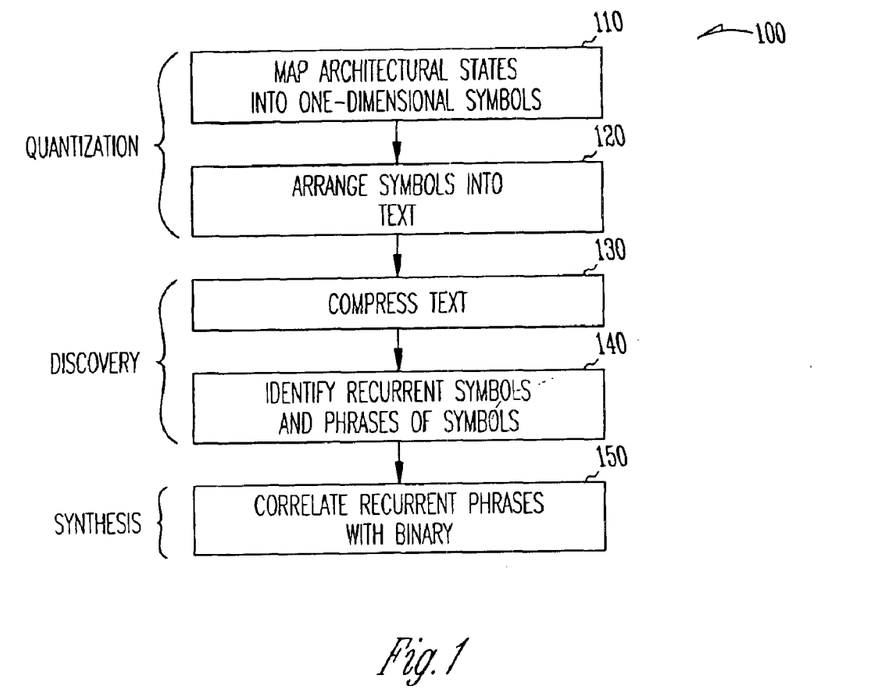
FIG. 1 shows a flowchart for a method of identifying candidates for computation reuse.

FIG. 1 shows a flowchart for a method of identifying candidates for computation reuse. Method 100 is broken down into three main categories: quantization, discovery, and synthesis. Quantization is illustrated by actions 110 and 120, discovery is illustrated by actions 130 and 140, and synthesis is illustrated by action 150.

Quantization

Quantization is the process of mapping multi-dimensional architectural states of an executing program into one-dimensional symbols, as shown in FIG. 1 at 110, and arranging the one-dimensional symbols into a text, as shown at 120. The multi-dimensional architectural states represent the history of computation within the program, and can be extracted into a "trace file" by the program as it runs. The trace file is said to include an "execution trace" of the program.

In some embodiments, the quantization is performed by traversing an execution trace in execution order, and identifying vectors corresponding to each instruction. The vectors are each represented by <instruction pointer (IP), live-in states, live-out states>. By default, the live-in states and live-out states are source and destination operands, respectively, of the instruction located at IP. In general, however, the live-in and live-out states can be any machine states that are read and modified during execution of an instruction, including but not limited to event states, exception states, and microarchitectural states. For simplicity, the remainder of this description focuses on architectural states and not microarchitectural states.

The entire execution of a program can be represented as a trace of the aforementioned vectors, each corresponding to the execution of a single instruction. Some of the vectors are unique, and others are repeated one or more times in the trace. During quantization, a one-dimensional symbol is assigned to each vector as it is encountered in the execution trace, and the one-dimensional symbols are ordered in a "text" that corresponds to the execution trace of the program.

As the execution trace of vectors is traversed, previously unencountered vectors are assigned new symbols. If, however, a previously encountered vector is again encountered, the previously assigned symbol is used again. In some embodiments, new symbols are assigned as integers in ascending order. Visual examples of the foregoing are provided in figures that follow.

When quantization is complete, an entire execution trace of a program is represented in a text of symbols, each symbol corresponding to one execution of one instruction. Sequences of symbols within the text are referred to as "phrases." If the text includes recurrent symbols or phrases, then an opportunity for computation reuse exists. Identifying recurrent symbols and phrases in the text allows the "discovery" of opportunities for computation reuse.

Discovery

The term "discovery" refers to the process of identifying, or "discovering" recurrent portions of the text. Discovering recurrent portions of text is equivalent to identifying reuse instances of single instructions and reuse instances of sequences of instructions. Because recurrent symbols in the text represent duplicate vectors <IP, live-in states, live-out states> in the execution trace, recurrent symbols correspond to a reuse instance of a single instruction located at IP. Likewise, recurrent phrases of symbols represent reuse instances of instruction sequences.

In different embodiments, recurrent symbols and phrases are discovered using different mechanisms. One such mechanism is compression. If a text is compressable, then some amount of redundancy within the text necessarily exists. This is shown at 130 in FIG. 1.

In some embodiments, computation reuse opportunities are discovered using lossless compression algorithms. One example of a lossless compression algorithm suitable for use in the present invention is Ziv-Lempel coding, commonly known as the algorithm used in the popular ZIP programs for compressing files on computers. The output of Ziv-Lempel coding includes a "dictionary" of all recurrent symbols and phrases of symbols, and their rank in frequency of occurrence.

Another example of a lossless compression algorithm is the SEQUITUR algorithm. For details on SEQUITUR, see C. G. Nevill-Manning, and I. H. Witten, "Linear-time, incremental hierarchy inference for compression," *Proc. Data Compression Conference*, J. A. Storer and M. Cohn (Eds.), Los Alamitos, Calif.: (1997) IEEE Press, and C. G. Nevill-Manning, I. H. Witten, & D. R. Olsen, "Compressing semi-structured text using hierarchical phrase identification," *Proc. Data Compression Conference*, J. A. Storer and M. Cohn (Eds.), Los Alamitos, Calif.: (1996) IEEE Press. The lossless compression algorithms discussed above identify recurrent symbols and phrases. This is shown at 140 in FIG. 1.

In other embodiments, lossy compression algorithms are used. Examples of lossy compression algorithms are those used in the GNU programs "agrep" and "gdiff." These programs produce an editing distance between similar phrases of text, rather than only identifying exact matches. Other lossy compression algorithms can be used without departing from the scope of the present invention. For example, traditional homology algorithms used in string matching for DNA sequence matching analysis and text mining can also be used.

The text (or its derivation such as the first order difference) can be viewed and interpreted much like a speech signal. Similar signal fragments can be found using morphological and statistical feature analysis. Examples include finding short-time energy variation, average zero-crossing rate, and short-time fundamental frequency analysis. Because lossy algorithms can cluster "similar" phrases of text, the clustered aggregates are less fragmented than those created using lossless approaches. Computation reuse based on lossy algorithms can take advantage of speculative execution in processors that support it, thereby providing the potential of increased reuse over lossless approaches.

Computation reuse based on lossy algorithms can be regarded as partial reuse while computation reuse based on lossless algorithms can be regarded as complete reuse. In modern microprocessors that employ various prediction algorithms, partial reuse can result in many benefits such as enhancing the accuracy of existing prediction schemes, or enabling entirely novel prediction schemes. For example, when a compare-for-greater-than instruction always produce positive result (in its destination register) regardless of variation of the exact values in the two source operands, partial reuse of the (IP, live-out) states can result in good prediction of program behavior, even though complete reusability does not hold.

Synthesis

"Synthesis" refers to the process of utilizing computation reuse information discovered in the discovery phase. Synthesis can take different forms depending on what is available at the time synthesis takes place. For example, when applying the various methods of the present invention to a binary file with no access to source code or the original build environment, synthesis can include correlating recurrent phrases of text with the binary file, and annotating those portions of the binary file that are identified by the recurrent symbols or phrases. This is shown at 150 in FIG. 1. In some embodiments, annotation includes providing non-essential code for use in a conjugate processor (discussed below with reference to FIG. 6). In other embodiments, annotation includes setting fields in an instruction to instruct a processor or simulator to memorize a reuse instance.

When applying the various methods and apparatus of the present invention with access to source code and build environment, synthesis can take other forms. For example, any static scheduling performed by a compiler can be influenced by the computation reuse information discovered.

Quantization Examples

Figure 2:
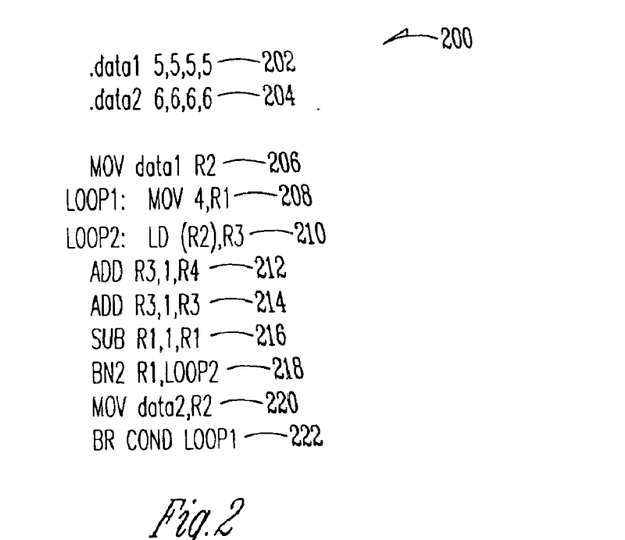
FIG. 2 shows a code fragment of assembly language software.

FIG. 2 shows a code fragment of assembly language software. Code fragment 200 is not a complete program, but instead is an example code fragment useful as an example to illustrate various embodiments of the present invention. Code fragment 200 includes statements 202, 204, 206, 208, 210, 212, 214, 216, 218, 220, and 222. Statements 202 and 204 define two sets of data, one with the label "data1," and the other with the label "data2." Statement 206 loads the address of statement 202 into register R2, and statement 208 loads register R1 with the value of four.

Statement 208 also marks the beginning of an outer loop that causes an inner loop to be executed four times. The inner loop includes statements 210, 212, 214, 216, and 218. Register R1 is used as a loop counter for the inner loop. After the inner loop executes four times, statement 220 changes register R2 to hold the address of statement 204 and then statement 222 branches back to the beginning of the outer loop.

Within the inner loop, statement 210 loads into register R3 data pointed to by register R2. Statement 212 adds one to the value in register R3 and stores the result in register R4. Statement 214 adds one to the value in register R3 and stores the result back in register R3. Statement 216 subtracts one from the loop counter variable in register R1, and statement 218 branches back to the beginning the inner loop if the value in register R1 is not zero.

As code fragment 200 is executed, some instructions are executed more than once, and some are executed many times. Some of these instructions and sequences of instructions are candidates for computation reuse.

Figure 3A:
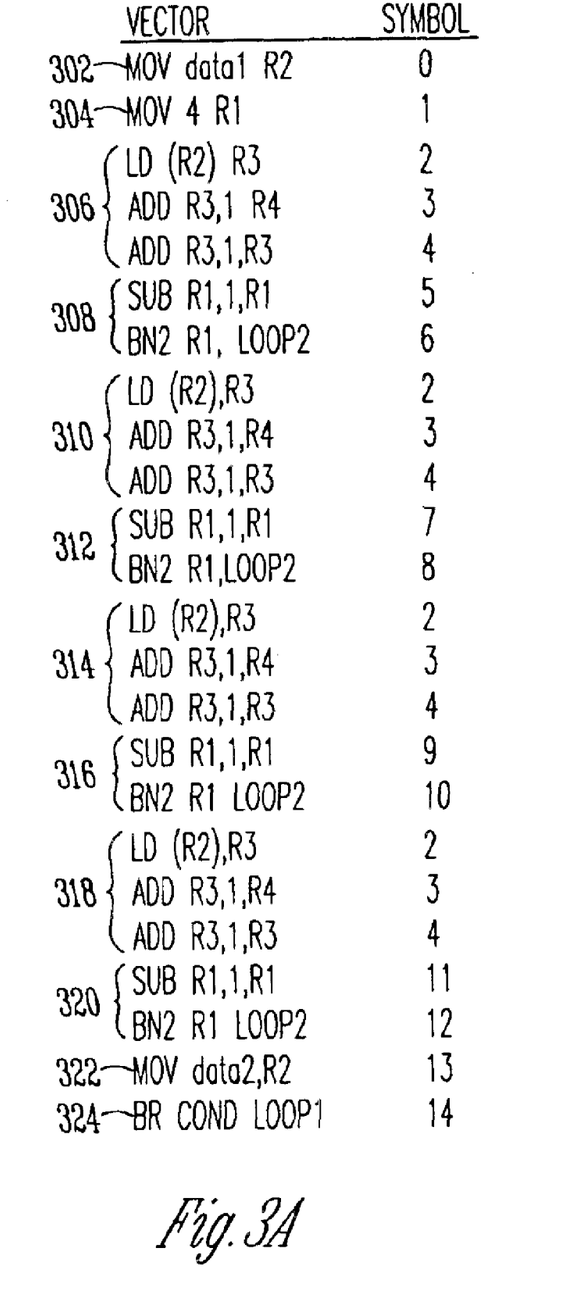
FIGS. 3A and 3B show an execution trace of the code fragment of FIG. 2.
Figure 3B:
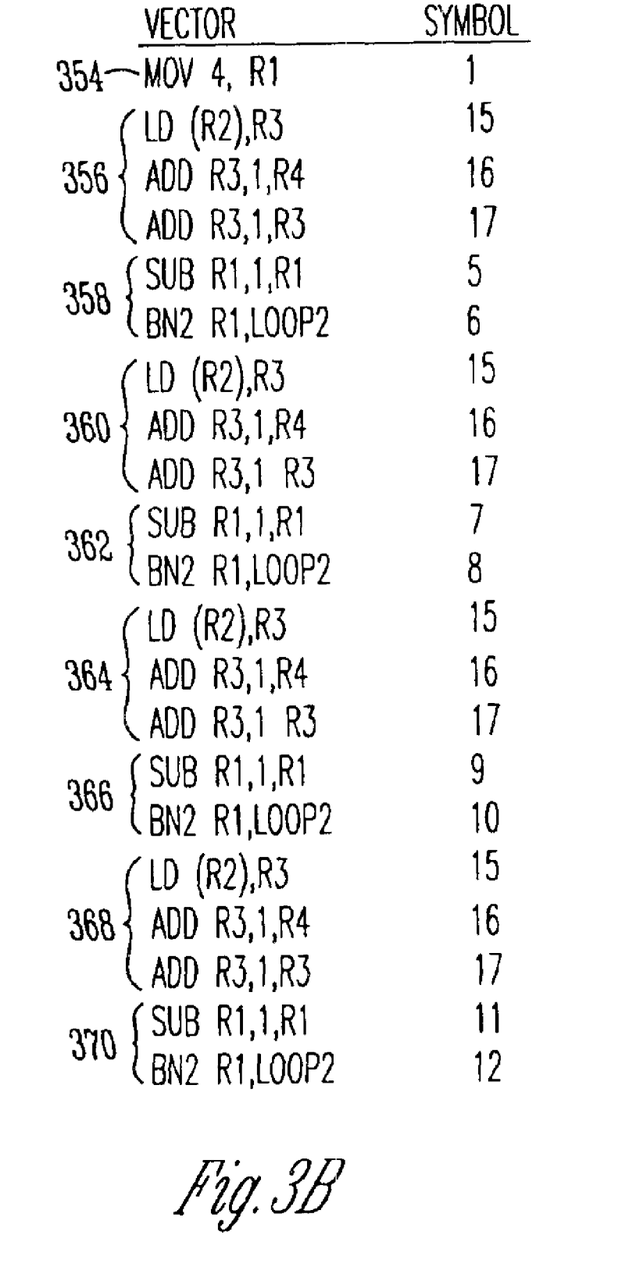

FIGS. 3A and 3B show an execution trace of the code fragment of FIG. 2. FIGS. 3A and 3B also show symbols assigned during quantization. FIG. 3A shows the portion of the execution trace that corresponds to the first iteration of the outer loop. FIG. 3B shows the portion of the execution trace that corresponds to the second iteration of the outer loop.

Instructions in the execution trace are labeled as vectors to indicate that each executed instruction is represented by <IP, live-in states, live-out states>. In this example, symbols are assigned to vectors such that each new vector is assigned the next available integer. The first symbol (the integer zero) is assigned to vector 302, which corresponds to instruction 206, and the second symbol (the integer "one") is assigned to vector 304.

The first iteration of the inner loop is represented by vector groups 306 and 308. Vectors in group 306 are assigned symbols two, three, and four, and vectors in group 308 are assigned symbols five and six. Each vector encountered in the trace thus far is unique, and has, accordingly, been assigned a new symbol.

The second iteration of the inner loop is represented by vector groups 310 and 312. Vectors in group 310 are assigned symbol values of two, three, and four because vectors in group 310 are the same as vectors in group 306. The vectors are the same because <IP, live-in states, live-out states> are the same. The IP is the same because the same assembly language instructions are being executed, albeit in a different iteration of a loop. The live-in states are the same because register R3 has a value of five in both cases.

Vectors in group 312 are assigned new symbol values because they have not been encountered before. The live-in states of vectors in group 312 are different from the live-in states of vectors in group 308 because register R1, which is used as a loop variable, has a different value.

The pattern just described repeats for the four iterations of the inner loop. Vectors in groups 314 and 318 are assigned symbol values of two, three, and four, because in each case, the vectors are the same as vectors in groups 306 and 310. Vectors in groups 316 and 320 are assigned new symbols because the live-in states are different each time through the inner loop. Vectors in groups 322 and 324 are also assigned new symbols because they represent instructions executed for the first time.

FIG. 3B shows the portion of the execution trace that corresponds to the second iteration of the outer loop. Vector 354 is the same as vector 304 (FIG. 3A), and so is assigned a symbol value of one.

Vectors in groups 356 and 358 correspond to the first iteration of the inner loop within the second iteration of the outer loop. Vectors in group 356 are assigned new symbols 15, 16, and 17 because they are vectors that have not yet been encountered in the execution trace. The instructions (IP) of vectors in group 356 are the same as vectors in group 306, but the live-in states and live-out states are different because register R3 has a value of six from data2 instead of a value of five from data1. Vectors in group 358 correspond to the decrementing of the loop variable and conditional branching. These vectors are the same as vectors in group 308 because the live-in states depend only on the inner loop variable in register R1.

Each of the iterations of the inner loop includes vectors corresponding to vectors in groups 356 and 358. For example, vectors in groups 360, 364, and 368 are assigned symbols in common with vectors in group 356. Also for example, vectors in groups 362, 366, and 370 are assigned symbols in common with vectors in groups 312, 316, and 320, respectively.

The symbols assigned to vectors in the execution trace show that some symbols are recurrent, and that some phrases of symbols are recurrent. A graphical representation of the symbols of FIGS. 3A and 3B is shown in FIG. 4.

Figure 4:
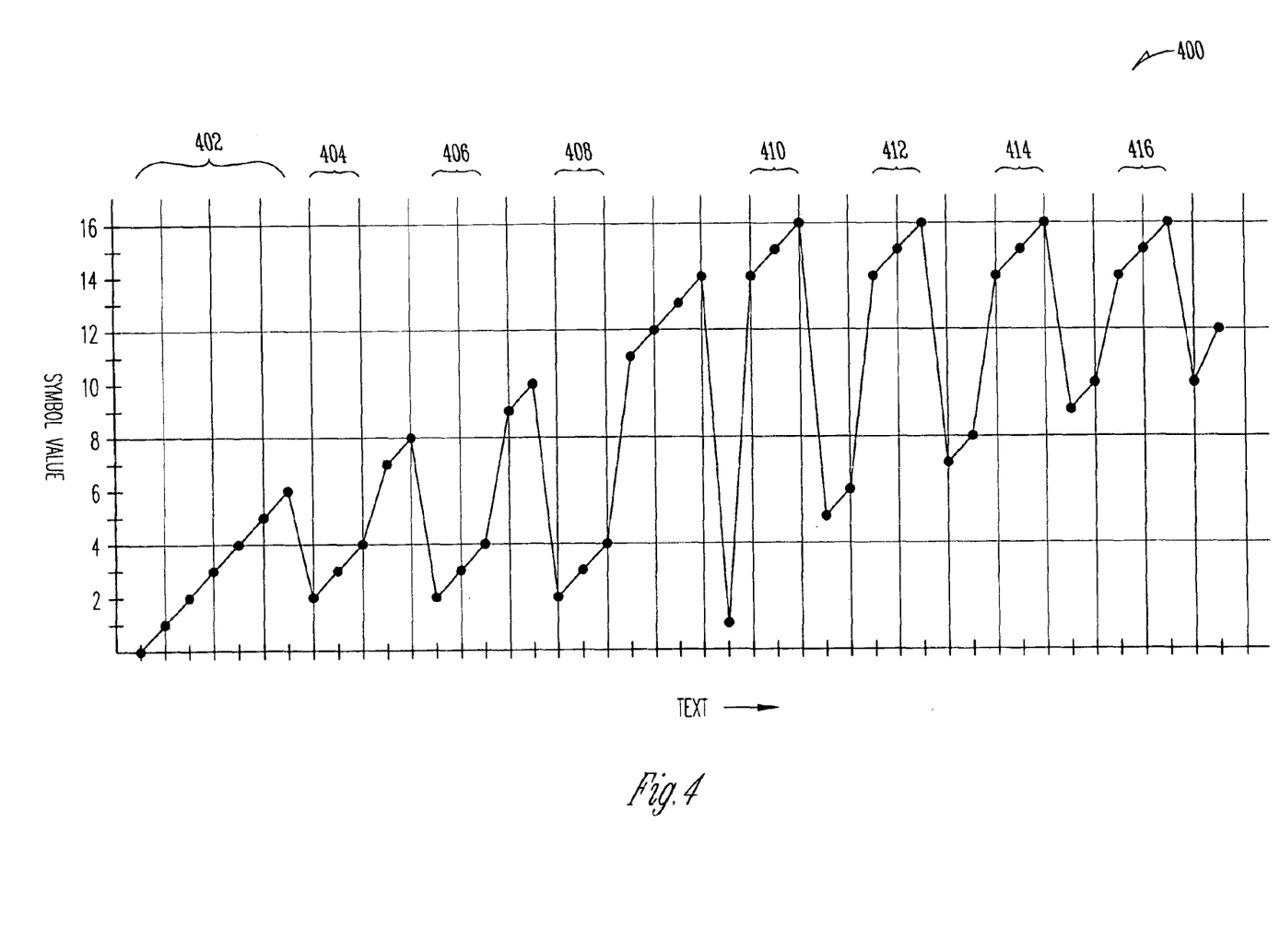
FIG. 4 shows symbols from FIGS. 3A and 3B represented graphically.

FIG. 4 shows symbols from FIGS. 3A and 3B represented graphically. Each data point on graph 400 corresponds to a single symbol assigned in FIGS. 3A and 3B. Graph 400 illustrates how symbols are assigned as integers with increasing value. For example, phrase 402 corresponds to a sequence of unique symbols assigned to vectors 302 and 304 and vectors in groups 306 and 308 of the execution trace. Phrase 402 includes symbols represented by integers arranged in ascending order because each of the vectors are encountered in the execution trace for the first time.

Phrases 404, 406, and 408 are made up of symbols assigned to vectors in groups 310, 314, and 318, respectively. These phrases are recurrent in the text because they represent identical sequences of instruction vectors, or symbols, in the execution trace. In general, whenever data points on graph 400 decrease in value from left to right, an opportunity for computation reuse exists because of a recurrent symbol or phrase of symbols.

Figure 5:
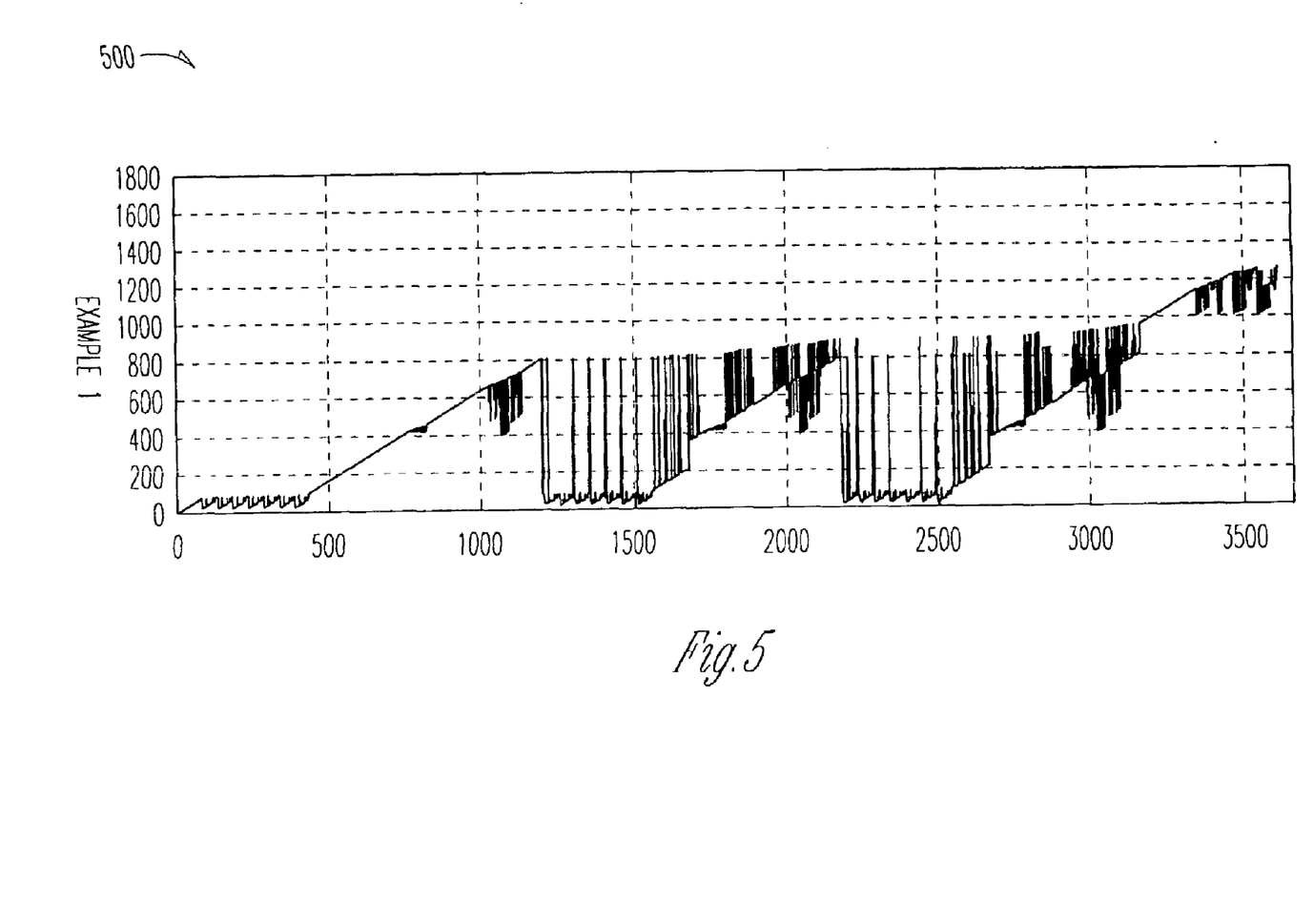
FIG. 5 shows symbols from an execution trace of a larger program.

FIG. 5 shows symbols from an execution trace of a larger program. Graph 500 was generated by assigning symbols to the execution trace of a larger code fragment. Each occurrence of a falling edge in graph 500 corresponds to a recurrent symbol or phrase, and represents an opportunity for computation reuse.

Graphs 500 and 400 (FIG. 4) provide a visual example of recurrent symbols and phrases of symbols in the text. Compression algorithms, such as Ziv-Lempel and SEQUITUR, discussed above, can be used to identify the recurrent symbols and phrases, and also to identify their frequency of occurrence.

Once the opportunities for computation reuse have been discovered, synthesis can be performed to take advantage of the results. In some embodiments, the dictionary of reuse instances is correlated with the binary version of the executable program from which the execution trace was generated. Each of the reuse instances can be mapped to instructions and sequences of instructions within the binary. The binary can be annotated such that a processor can take advantage of the reusable computation units within the binary. In other embodiments, a compiler utilizes the reuse information, and modifies the compilation of the program as a result.

In some embodiments, non-essential code can be generated for execution on a conjugate processor. The non-essential code can implement the reuse discovered as a result of the method and apparatus of the present invention. An exemplary conjugate processor is now described.

Conjugate Processor

Figure 6:
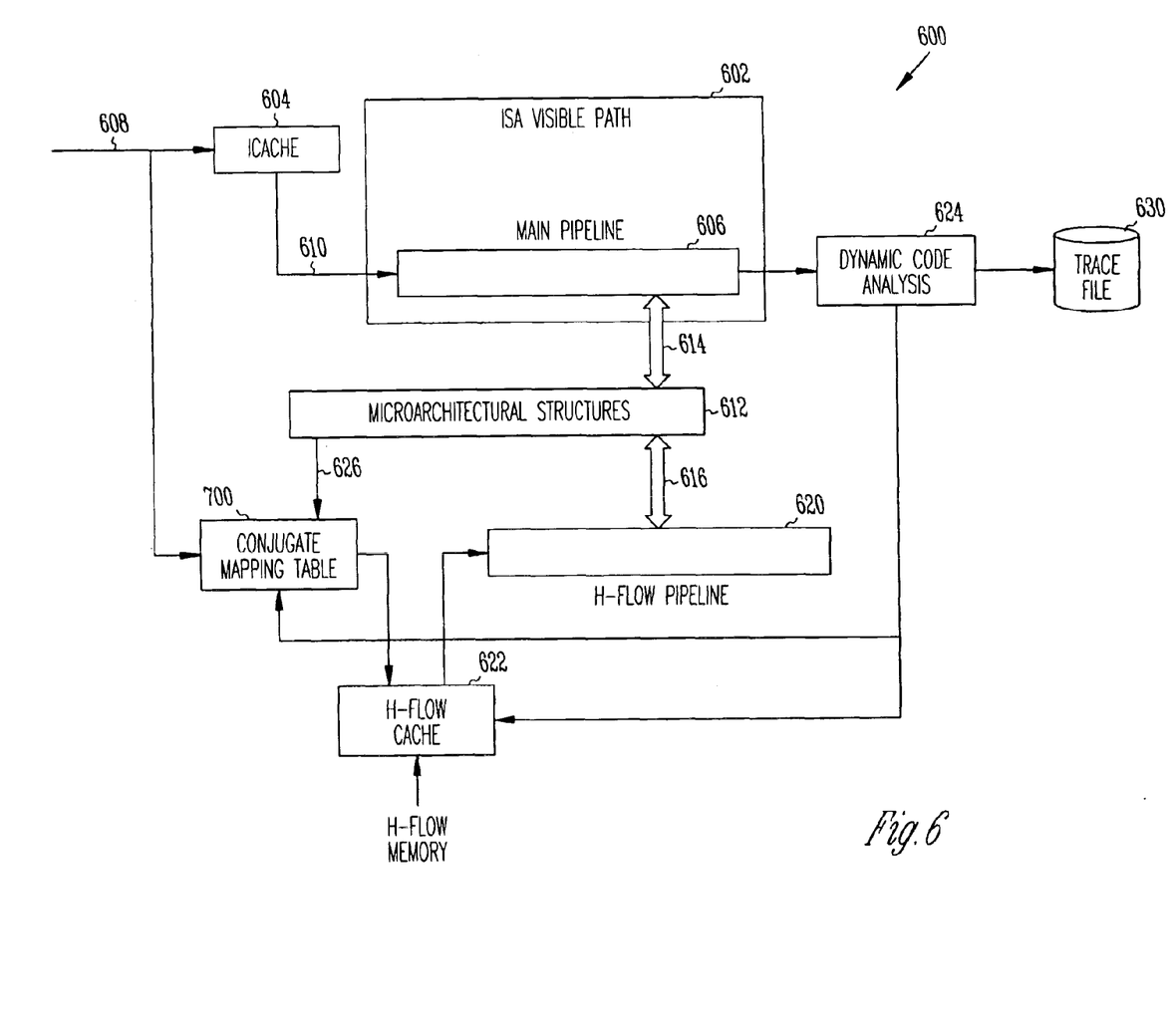
FIG. 6 shows a logical representation of a conjugate processor.

FIG. 6 shows a logical representation of a conjugate processor. Conjugate processor 600 includes instruction set architecture (ISA) visible path 602, microarchitectural structures 612, conjugate mapping table 700, h-flow cache 622, h-flow pipeline 620, and dynamic code analysis block 624. "H-flow" is a term that describes a "hint calculus" instruction flow that is separate from the main instruction flow in main pipeline 606 within ISA visible path 602. "Hint calculus" is a term that describes the action of h-flow pipeline 620 as it generates "hints" and communicates them to microarchitectural states 612. Hint calculus is, by definition, non-essential code. In other words, hint calculus does not affect the logical correctness of the application level software.

Figure 7:
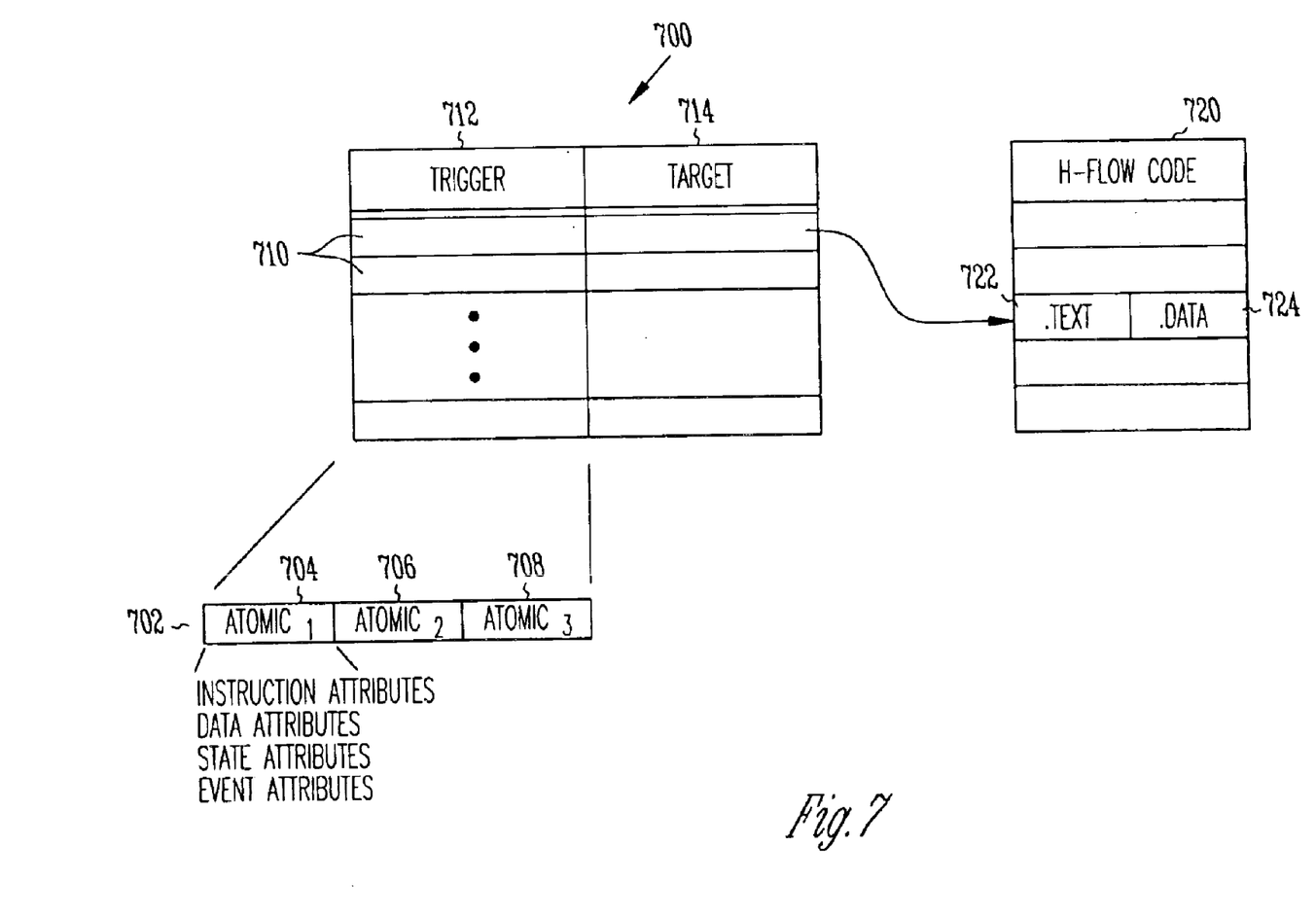
FIG. 7 shows a conjugate mapping table.

Conjugate processor 600 can be effectively utilized to exploit computation reuse identified using mechanisms described above. H-flow code can be generated in the synthesis phase, and entries in conjugate mapping table 700 can be generated to identify when live-in states match those of a particular reuse instance. This is explained further below.

ISA visible path 602 includes main pipeline 606 and structures associated therewith. Structures within ISA visible path 602 are visible to the applications level programmer, hence the term "ISA visible." Icache 604 receives instructions on node 608, and provides instructions to main pipeline 606 on node 610. Main pipeline 606 includes pipeline stages such as decoding, executing, and committing. In general, ISA visible path 602, and main pipeline 606 in particular, execute essential code.

Icache 604 and h-flow cache 622 are logically separate cache memories. Each holds instructions from different instruction streams. Icache 604 holds essential instructions and h-flow cache 622 holds non-essential instructions. In some embodiments, the physical design of the cache combines Icache 604 and h-flow cache 622. In these embodiments, an instruction fetched into h-flow cache 622 is available in Icache 604 to be fetched by main pipeline 606. In some embodiments, this feature is exploited for instruction prefetch purposes by using h-flow pipeline 620 to prefetch essential instructions that are expected to be executed by main pipeline 606.

Conjugate processor 600 is referred to as a "logical" representation because it is not necessary to have physically separate pipelines for essential and non-essential code. For example, a conjugate processor can be implemented using multithreading, where one thread performs essential computation, and another thread performs non-essential computation.

Main pipeline 606 communicates with microarchitectural structures 612. Microarchitectural structures 612 include structures that store the microarchitectural states of the processor. Examples include register banks, branch target buffers (BTBs), and data cache. In some embodiments, microarchitectural structures 612 also includes one or more reuse buffers to hold reuse instances for code regions identified using the method and apparatus of the present invention. Main pipeline 606 can retrieve state information from microarchitectural structures 612, and can also modify state information held in microarchitectural structures 612.

The terms "architectural structures" and "architectural states" are used herein to describe the processor at a level that is visible to a programmer. For example, structures included within ISA visible path such as an architectural register file in main pipeline 606 are architectural structures. In contrast, the terms "microarchitectural structures" and "microarchitectural states" are used herein to refer to low level logical structures within the processor that are not necessarily visible to a programmer. For example, conjugate processor 600 includes microarchitectural structures 612 that are not within ISA visible path 602, but that can influence architectural states of main pipeline 606 using communications on node 614. In some embodiments, the architecture is implemented using the microarchitecture, and the architectural states are a subset of the microarchitectural states.

Conjugate mapping table 700 receives instructions on node 608 and state information on node 626. The state information on node 626 can be microarchitectural or architectural state information. In some embodiments, conjugate mapping table 700 includes triggers and targets. When triggers are satisfied, then the target is communicated to h-flow cache 622, which in turn provides instructions from h-flow memory or cache structures that include h-flow code (not shown) to h-flow pipeline 620. Conjugate mapping table 700 is explained more fully with reference to FIG. 7 below. H-flow cache 622 can include actual h-flow code sequences, sometimes referred to as "handlers," or can include pointers to the handlers. H-flow cache 622 can also include pointers to data that is used by h-flow code.

In some embodiments, h-flow is a conjugate flow that represents the logical conjugate of the normal instruction flow of the processor. The normal flow of the processor executes instructions that provide the logical correctness of the program. For example, instructions compiled from a user's program are executed in main pipeline 606, and this execution modifies the architectural state of processor 600 in the manner intended by the user. This is the essential code, or the code that ensures the architectural state is modified in the manner intended by the user. The code is called "essential" because it is what determines the final architectural state of the processor.

H-flow code, in contrast, is "non-essential" code. It is referred to as non-essential because in some embodiments, it does not directly affect architectural states of processor 600, even though it may affect microarchitectural states of the processor. H-flow encodes or computes hints that can potentially lead to improved efficiency in computation of the essential code in main pipeline 606. For example, the process of synthesis described above can include the generation of h-flow code designed to reuse previous results by modifying microarchitectural (or architectural) states of processor 600.

Instructions defined for execution by h-flow pipeline 620 include instructions to handle state transfer and resource mapping between states of main pipeline 606 and states of h-flow pipeline 620. Examples include instructions to download states from the main pipeline's registers to the h-flow pipeline's registers, and instructions to upload states from the h-flow pipeline's register to the main pipeline's registers.

Conjugate flow processor 600 provides a general schema to express a flexible association of diverse hints with the essential portion of the code at various granularities of instructions. This is provided through conjugate mapping table 700, which is described more fully with reference to FIG. 7 below. Because the non-essential portion of the code is not intermixed with the essential portion, conjugate processor 600 can support dynamic computation of hint calculus for any aspect of the microarchitectural optimization without impacting the organization of the essential code.

Dynamic code analysis block 624 analyzes the execution of code in main pipeline 606. Dynamic code analysis block 624 can generate h-flow code, and can also generate trace file 630. Trace file 630 includes an execution trace of the program. The generated h-flow code, when executed, provides hints to ISA visible path 602 in an attempt to improve execution behavior.

In some embodiments, dynamic code analysis generates h-flow code and replaces default h-flow code that was created at compile time. For example, in the case of a web browser capable of accepting "plug-ins," optimum h-flow code for a plug-in cannot be generated at compile time for the web browser. When a plug-in is installed in the web browser, the dynamic code analysis can adaptively modify the h-flow code utilized with the plug in. The h-flow code can be saved in a ".hint" section so that the next time the plug-in is executed, the h-flow code that is loaded is the h-flow code generated for the plug-in. The .hint section is a section of an executable file, much like a .text, .bss, or .data section, and can be saved with the .hint section for the web browser, or can be saved separately and dynamically linked when the web browser uses the plug-in.

It is not necessary for conjugate processor 600 to include dynamic code analysis block 624. Although dynamic code analysis block 624 provides a flexible mechanism for adaptively generating h-flow code, it is not the only mechanism to generate h-flow code. H-flow code can be statically generated, or can be dynamically linked from other sources. In some embodiments, h-flow code to implement computation reuse is statically generated. For example, as described above with reference to FIG. 1, synthesis can include statically generating h-flow code and triggers to implement computation reuse.

During execution of the program with h-flow, whenever an instruction's fetch IP matches a trigger that checks an instruction location for a potentially reusable instruction or sequence, a reuse h-flow calculus is performed to compare the live-in states with the current architectural states in the main pipeline. If a match is found, the entire reusable sequence is restored from the main pipeline's decode stage directly into the retirement check stage. If there is a memory instruction in the reusable sequence, the h-flow code can also check memory translation and snoop during the retirement check, prior to the reuse sequence being retired. In the microarchitecture, when a potential reuse instance is identified by the h-flow, the main pipeline can be stalled or switched to another thread while the reuse check hint calculus is performed.

FIG. 7 shows a conjugate mapping table. Conjugate mapping table 700 is a hardware table that implements conjugate mapping between triggers 712 and targets 714. Conjugate mapping table 700 includes records 710, or "entries," that each map a trigger to a target. Triggers are conditions that can be satisfied, and targets are references to h-flow code sequences 720. When a trigger in a record is satisfied, h-flow code specified by the target is triggered. As a result, the h-flow code is executed in the h-flow pipeline.

Triggers included within conjugate mapping table 700 can include any information useful to trigger the execution of an h-flow code sequence. Examples include instruction triggers, data triggers, state triggers, and event triggers. Instruction triggers can trigger an h-flow code sequence based on instruction attributes such as address, opcode, operand, and the like. Data triggers can include data attributes such as data operand values, data locations (including memory locations and register IDs), and the like. State triggers include architectural and microarchitectural state information such as the state of microarchitectural structures that influence speculative execution, code reuse, and the like. Event triggers can include any event that occurs when software is executing. Examples of events include processor interrupts and exceptions.

Trigger 702 is shown as an exploded view of one of triggers 712 in conjugate mapping table 700. Trigger 702 is a "vector" trigger made up of multiple "atomic" attributes 704, 706, and 708. In general, triggers 712 can include single atomic attributes, or can include vector triggers. When a trigger is specified as a vector, as in the example of trigger 702, the trigger is satisfied when a boolean function of the atomic values is satisfied. For example, in an embodiment where atomic value 704 includes an instruction location, and atomic values 706 and 708 include live-in states, and the boolean function is "and," trigger 702 is satisfied when the specified instruction location is accessed and the current processor state matches live-in states specified in the trigger.

Atomic triggers can be negated, and by listing several vector triggers with the same target, a nearly arbitrary sum-of-product expression can be generated. For example, two vector triggers with the same target can be used to generate the logical function: "trigger h-flow A execution if (1) the instruction pointer is X and register R is not zero, or (2) the instruction pointer is Y and the translation look-ahead buffer (TLB) is full. In some embodiments, Nth occurrence triggers are implemented. For example, an Nth occurrence trigger can implement the logical function: "trigger h-flow A execution if N BTB misses are observed."

In some embodiments, targets within conjugate mapping table 700 represent code and data. In other embodiments, targets within conjugate mapping table point only to h-code sequences. The h-code sequences can have code sections and data sections such as ".text" section 722 and ".data" section 724 that are generated by a compiler or by dynamic code analysis block 624 (FIG. 6). Within the data section, an h-flow sequence can save state information. For example, an h-flow sequence may be used to gather runtime profile information later used to gather reuse instances for reusable blocks of essential code. This profile information can be saved in the data section.

Instruction Triggers

Instruction triggers can specify conditions based on one or more instruction attributes. These attributes include instruction locations (sometimes referred to as "instruction pointer values"), instruction opcodes, instruction operands, or the like. When one of these attributes is used alone, it is an atomic trigger. An atomic trigger is satisfied when the condition specified by the single attribute is satisfied. For example, if an atomic trigger specifies an instruction pointer value, the trigger is satisfied when the instruction pointer value is encountered in the program, and the h-flow code specified in the target of the corresponding record is triggered as a result.

When an instruction opcode is mapped as an atomic trigger to an h-flow code sequence, the trigger is satisfied and the h-flow code sequence is executed when the opcode is encountered in the instruction stream. Likewise, when an instruction operand is mapped as an atomic trigger to an h-flow code sequence, the trigger is satisfied when the operand is encountered in the instruction stream.

Instruction attributes can be utilized separately as atomic triggers, or they can be used in combination as vector triggers. For example, when an opcode and operand are utilized together to create a vector trigger, the trigger is satisfied when an instruction is encountered having both the opcode and the operand. This allows more discrimination in the triggering of h-flow code sequences.

Example uses for triggers based on instruction attributes include speculative execution and computation reuse. For example, if a frequently encountered block of essential code can be reused, meaning for the same set of input values (live-in states), the code block produces the same set of output values (live-out states), the instruction pointer marking the entrance to the reused block becomes a trigger entered in conjugate mapping table 700 and an h-flow code sequence implements the detection and verification of the reusability function in the h-flow pipeline to check whether there is a match of live-in states. Instruction triggers can be generated in the synthesis process described above.

Likewise, if a particular branch within a program is often taken, an instruction pointer value that precedes the branch can be used as a trigger to cause speculative execution of the code in the taken branch. The results of speculative execution in the h-flow pipeline can be used in multiple ways. For example, the states of the h-flow pipeline that result from speculative execution can be copied to the main pipeline, or the actions of the h-flow pipeline can cause the instructions in the taken path to be fetched into instruction cache so that when the main pipeline takes the branch, the instructions are in instruction cache memory and can be fetched with low latency.

An example use of an instruction operand in a trigger includes the remapping of virtual register sets. In some embodiments, a memory address or register ID can be specified as a trigger. When the location or register is accessed, the trigger is satisfied, and the corresponding h-flow code sequence is executed in the h-flow pipeline. If, in one generation of microprocessors, 128 registers exist, and in a later generation 256 exist, software compiled for the later generation may reference a register number higher than 128. When this code executes on the earlier generation processor, conjugate mapping table 700 can have triggers that include a register address greater than 128. The trigger can cause h-flow code to perform a virtual mapping of registers such that software can run that attempts to access a greater number of registers than physically exist in a processor. In this manner, a bank of registers can be renamed or re-mapped using h-flow code sequences.

Like the alternative register mapping described above, when a memory location is used as an instruction operand atomic trigger in conjugate mapping table 700, alternative mappings for memory can be utilized. For example, a translation look ahead buffer (TLB) can be accessed with h-flow code. In this manner, an operating system can construct its own paging mechanism to manage a TLB manipulated by h-flow code. This effectively allows an operating system to virtualize existing hardware normally built into the processor.

Another example use of instruction attributes as triggers involves error checking. For example, an h-flow code sequence that performs an error checking routine can be triggered using an instruction operand as an atomic trigger. In this manner, certain registers, memory locations, or groups thereof, can be selectively subjected to error detection using h-flow.

Instruction attributes as atomic triggers allow interception of code in the main pipeline at the instruction level. The contents of the atomic trigger specify an attribute of an instruction that is used for interception purposes. For example, when the atomic trigger is an instruction pointer, the instruction at that address triggers an h-flow sequence. Likewise, when the atomic trigger is an opcode, instructions represented by the opcode trigger an h-flow sequence. In the preceding paragraphs, atomic triggers have been described with reference to a few examples; however, any type of instruction attribute can be utilized as an atomic trigger without departing from the scope of the present invention.

Data Triggers

Data triggers can specify conditions based on one or more data attributes. These attributes include data operand values, data locations (including memory locations and register IDs), and the like. When one of these attributes is used alone, it is an atomic trigger. For example, if a trigger specifies a data operand value, the trigger is satisfied when the data operand value is encountered in the program, and the h-flow code specified in the target of the corresponding record is triggered as a result. Vector combinations of data attributes can also be used as triggers. For example, in an embodiment where a vector combination of data location and data operand value is used as a trigger, the trigger is satisfied when the data operand value and the data location are satisfied at once. This can occur when a "load" instruction loads the data operand value from the data location.

Typically, data operand values are available later in the pipeline process than instruction related values described above. For example, data operand values are usually available during execution, whereas instruction related information is usually available shortly after fetching.

One example use of a data operand as an atomic trigger is the register address of a register dedicated as the stack pointer. It may be beneficial to perform more checking when the data operand represents a stack pointer, than when the data operand represents any other register. When a stack pointer register is used as a data operand, an h-flow code sequence that checks the validity of the stack pointer can be triggered. This can add any level of checking using h-flow code. This is logically equivalent to built-in-self-test (BIST), but unlike traditional BIST that is hardwired during chip fabrication, h-flow enabled BIST allows more flexibility. H-flow enabled BIST provides the ability to circumvent known bad circuitry by emulating missing functionality or rerouting access around damaged resources. This is an example of microarchitectural level resource virtualization.

If the value in the stack pointer register is within a range expected to be a valid stack in a user program, more extensive checking may be employed. When the stack pointer represents the operating system kernel stack pointer, the context has switched from a user program to the kernel, and less checking may be needed. In general, any type of h-flow code sequence can be applied.

As previously described, any vector combination of atomic values can be utilized as a trigger in conjugate mapping table 700. Vector triggers can include instruction attributes, data attributes, or any other attributes in any combination. For example, when an instruction operand and a data operand value are combined as a vector trigger, an h-flow code sequence can be triggered when a particular data operand value is associated with a particular instruction operand. This allows an h-flow code sequence to be associated with particular runtime contexts, such as when the instruction operand is a stack pointer register, and the data operand value is a stack pointer value associated with a particular context.

H-flow code sequences can also be utilized to fetch into cache those instructions that are expected to be used by the main pipeline. When h-flow code prefetches instructions into cache, the fetching operation of the main pipeline can be much quicker. For example, when a user program calls a function in a dynamic link library (DLL), such as the "putc" function which prints a character in the "C" language, instructions associated with the function being called are resident in the DLL. An atomic or vector trigger can be built that represents an instruction prior to the DLL call, and can be used as a trigger for an h-flow code sequence that begins to fetch the instructions so that they are within cache when needed by the main pipeline.

A data location trigger can be utilized to trigger h-flow code sequences based on the location of a data value. For example, if a data value is resident within a protected area of memory, an h-flow code sequence can be triggered that verifies access privileges of the user executing the code in the main pipeline. This enables access sandboxing.

An h-flow code sequence can also be used for error detection and correction in specific areas of on-chip memory. For example, if one or more cache locations is known to be unreliable or defective, an atomic trigger or a vector trigger can be built that represents an access to the unreliable cache location and an h-flow code sequence that performs error detection and correction can be employed. In these embodiments, the effective yield of the integrated circuit can be increased because the faulty cache locations can be made to function correctly. Effectively, the conjugate flow hardware and h-flow code become error-tolerating parity resources for the main pipeline.

State Triggers

State triggers can specify conditions based on one or more state attributes. These attributes include architectural and microarchitectural states. Examples include state information held in reuse buffers, branch target tables, and other microarchitectural structures that support speculation. State attributes can be combined with instruction attributes and data attributes to create hybrid vector triggers. When the hybrid vector trigger is satisfied, the corresponding h-flow code is triggered.

Event Triggers

Triggers within conjugate mapping table 700 can also include event attributes. Examples of events are interrupts, exceptions, and the like. In some embodiments, events are fully specified using vector combinations of atomic instruction triggers and atomic data triggers. In this manner, h-flow code sequences can be utilized in place of interrupt routines and exception handlers, or can be utilized as epilogs and prologs of interrupt routines and exception handlers. Another example of an event usable as a trigger in conjugate mapping table 700 is a processor state register. In some embodiments, processor state registers include bits or values that represent interrupts and exceptions. When these bits or values are changed, interrupts or exceptions occur. When one of these interrupts or exceptions is to be used as an event trigger, the processor state register can be used as an event trigger.

Triggers can also be specified by otherwise unused portions of instruction opcodes or instructions words. For example, in a processor having a 64 bit instruction field with six unused bits, the six unused bits can be utilized as an conjugate mapping trigger. These otherwise unused bits can be used alone as an atomic trigger or can be used in combination with other atomic values to generate a vector trigger.

Data, state, and event triggers can be applied for computation reuse, partial or complete (lossy or lossless), when the discovery mechanism is applied to the triggering states, architectural, or microarchitectural, or hybrid. Triggers thus synthesized can be used to exploit partial or complete reuse.

Figure 8:
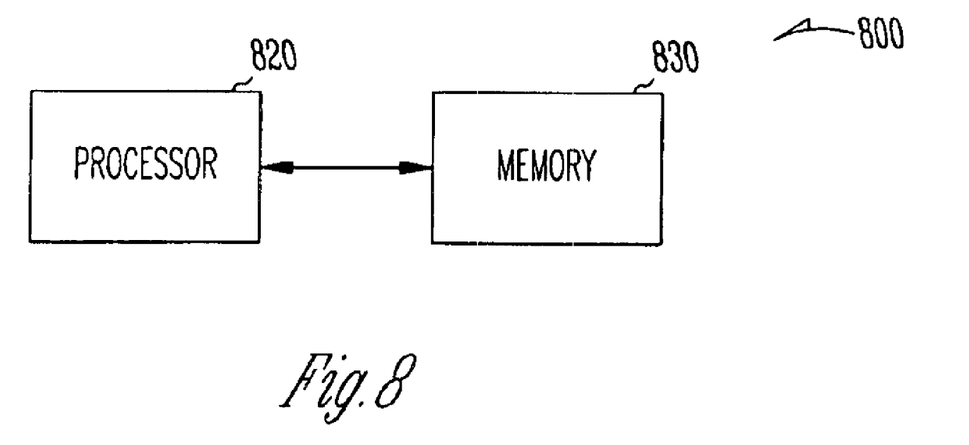
FIG. 8 shows a processing system.

FIG. 8 shows a processing system. Processing system 800 includes processor 820 and memory 830. In some embodiments, processor 820 is a conjugate processor such as processor 600 (FIG. 6). In some embodiments, processor 800 is a processor capable of identifying reusable computation units using methods such as those shown in FIG. 1. Processing system 800 can be a personal computer (PC), server, mainframe, handheld device, portable computer, set-top box, or any other system that includes software.

Memory 830 represents an article that includes a machine readable medium. For example, memory 830 represents any one or more of the following: a hard disk, a floppy disk, random access memory (RAM), read only memory (ROM), flash memory, CDROM, or any other type of article that includes a medium readable by a machine. Memory 830 can store instructions for performing the execution of the various method embodiments of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system comprising:
    a random access memory to store at least a part of a number of processor instructions; and
    a processor including,
        a first pipeline to execute the number of processor instructions;
        a conjugate mapping table to store at least one entry that includes a trigger and an associated target related to execution of the number of processor instructions; and
        a second pipeline to execute code related to the associated target if the trigger is satisfied during execution of the number of processor instructions, the second pipeline to modify one of a number of states of the processor based on execution of the code.

2. The system of claim 1, wherein the processor further includes a dynamic code analysis block to generate the code based on an analysis of the execution of the number of processor instructions by the main pipeline.

3. The system of claim 1, wherein the processor further includes a structure to store the number of processor states.

4. The system of claim 1, wherein the number of processor states include values stored in register banks, branch target buffers or data cache.

5. A method comprising:
executing, in a first pipeline, a number of processor instructions;
storing, in a conjugate mapping table, at least one entry that includes a trigger and an associated target related to the execution of the number of processor instructions; and
executing, in a second pipeline, code related to the associated target if the trigger is satisfied during the execution of the number of processor instructions, wherein the second pipeline is to modify one of a number of processor states based on execution of the code.

6. The method of claim 5 further comprising:
generating the code based on an analysis of the execution of the number of processor instructions by the main pipeline.

7. The method of claim 6, wherein the analysis includes, mapping n-dimensional architectural state vectors, which are representative of instances
of ones of the number of processor instructions, into a plurality of one-dimensional symbols; arranging the plurality of one-dimensional symbols into phrases of text; and identifying recurrent phrases of text as reusable computation units.

8. The method of claim 7, wherein the mapping includes, traversing a software block in program execution order; assigning new symbols as previously un-encountered architectural state vectors are encountered; and assigning previously assigned symbols as previously encountered architectural state vectors are encountered.

9. The method of claim 8, wherein assigning new symbols includes assigning consecutive integers such that each new symbol is assigned a value that is one greater than a previously assigned value.

10. The method of claim 7, wherein the arranging includes arranging ones of the plurality of one-dimensional symbols in program execution order.

11. The method of claim 7, wherein the architectural state vectors include live-in states and live-out states for ones of the processor instructions.

12. The method of claim 7, wherein the identifying includes compressing the phrases of text to find a plurality of recurrent phrases.

13. The method of claim 12, wherein the compressing includes compressing the phrases of text using a lossless compression algorithm.

14. The method of claim 13 further comprising generating at least one trigger for a conjugate processor, the at least onet rigger to implement complete reuse.

15. The method of claim 12, wherein the compressing comprises compressing the phrases of text using a lossy algorithm.

16. The method of claim 15 further comprising generating at least one trigger for a conjugate processor, the at least one trigger to implement partial reuse.

17. The method of claim 12, wherein the identifying further includes correlating the plurality of recurrent phrases to identify reusable computation units.

18. The method of claim 5 further comprising:
storing the number of processor states.

19. The method of claim 5, wherein the number of processor states include values stored in register banks, branch target buffers or data cache.

20. The method of claim 5, wherein the trigger is selected from a group consisting of instruction triggers, data triggers, state triggers and event triggers.

21. The method of claim 5, wherein the trigger can include single atomic attributes or can include vector triggers.

22. A computer-readable medium containing computer instructions which when executed will perform the following:
executing, in a first pipeline, a number of processor instructions;
storing, in a conjugate mapping table, at least one entry that includes a trigger and an associated target related to the execution of the number of processor instructions; and
executing, in a second pipeline, code related to the associated target if the trigger is satisfied during the execution of the number of processor instructions, wherein the second pipeline is to modify one of a number of processor states based on execution of the code.

23. The computer-readable medium of claim 22 further containing computer instructions which when executed will perform:
generating the code based on an analysis of the execution of the number of processor instructions by the main pipeline.

24. The computer-readable medium of claim 22 further containing computer instructions which when executed will perform:
storing the number of processor states.

25. The computer-readable medium of claim 22, wherein the number of processor states include values stored in register banks, branch target buffers or data cache.

26. The computer-readable medium of claim 22, wherein the trigger is selected from a group consisting of instruction triggers, data triggers, state triggers and event triggers.

27. The computer-readable medium of claim 22, wherein the trigger can include single atomic attributes or can include vector triggers.

28. A processor comprising:
a first pipeline to execute a number of processor instructions;
a table to store at least one entry that includes a trigger and an associated target related to execution of the number of processor instructions; and
a second pipeline to execute code related to the associated target if the trigger is satisfied during execution of the number of processor instructions, the second pipeline to modify one of a number of processor states based on execution of the code.

29. The processor of claim 28, wherein the trigger is to check a location of one of the processor instructions to determine a potentially reusable processor instruction.

30. The processor of claim 28, wherein the code is generated as a result of identifying ones of the number of processor instructions that are candidates for computation reuse, wherein the identifying includes creating an execution trace of ones of the number of processor instructions, compressing the execution trace to find recurrent portions thereof, and identifying the recurrent portions of the execution trace as reusable computation units.

31. The processor of claim 30, wherein the creating the execution trace includes executing ones of the number of processor instructions and mapping architectural states of the ones of the number of processor instructions into symbols.

* * * * *